(12) United States Patent
Passarella et al.

(10) Patent No.: US 8,774,155 B2
(45) Date of Patent: Jul. 8, 2014

(54) TRANSPORTING CALL DATA VIA A PACKET DATA NETWORK

(75) Inventors: Rossano Passarella, Mukilteo, WA (US); Jayesh Sukumaran, Woodinville, WA (US); Yan Zhang, Bellevue, WA (US)

(73) Assignee: Broadcom Corporation, Irvine, CA (US)

( * ) Notice: Subject to any disclaimer, the term of this patent is extended or adjusted under 35 U.S.C. 154(b) by 404 days.

(21) Appl. No.: 11/516,676

(22) Filed: Sep. 5, 2006

(65) Prior Publication Data

US 2007/0183423 A1     Aug. 9, 2007

Related U.S. Application Data

(60) Provisional application No. 60/765,258, filed on Feb. 3, 2006.

(51) Int. Cl.
*H04J 3/00* (2006.01)
*H04L 12/66* (2006.01)
*H04L 12/28* (2006.01)

(52) U.S. Cl.
USPC ............................ 370/345; 370/352; 370/392

(58) Field of Classification Search
None
See application file for complete search history.

(56) References Cited

U.S. PATENT DOCUMENTS

| | | | |
|---|---|---|---|
| 6,904,027 B1* | 6/2005 | Mukherjee | 370/331 |
| 7,002,993 B1* | 2/2006 | Mohaban et al. | 370/471 |
| 7,362,721 B1* | 4/2008 | Asawa et al. | 370/328 |
| 7,551,644 B1* | 6/2009 | Mohaban et al. | 370/473 |
| 2002/0015387 A1 | 2/2002 | Houh | |
| 2002/0018569 A1* | 2/2002 | Panjwani et al. | 380/247 |
| 2002/0191554 A1* | 12/2002 | Kondo | 370/328 |
| 2003/0093550 A1* | 5/2003 | Lebizay et al. | 709/236 |
| 2003/0147372 A1* | 8/2003 | Pattavina et al. | 370/345 |
| 2003/0148779 A1* | 8/2003 | Aravamudan et al. | 455/519 |
| 2003/0195001 A1* | 10/2003 | Tari et al. | 455/435.2 |
| 2004/0005904 A1 | 1/2004 | Wolf et al. | |
| 2004/0066763 A1* | 4/2004 | Hashimoto et al. | 370/329 |
| 2004/0114623 A1* | 6/2004 | Smith | 370/466 |
| 2004/0179555 A1* | 9/2004 | Smith | 370/521 |
| 2004/0264454 A1 | 12/2004 | Rajkumar et al. | |
| 2005/0071682 A1* | 3/2005 | Kurokawa | 713/201 |

(Continued)

FOREIGN PATENT DOCUMENTS

| | | | |
|---|---|---|---|
| EP | 1063830 A1 | 12/2000 | |
| EP | 1217797 A1 | 6/2002 | |
| EP | 1845740 A1 * | 10/2007 | |
| WO | WO01/35162 A1 | 6/2000 | |
| WO | WO01/30045 A1 | 4/2001 | |

OTHER PUBLICATIONS

European Patent Office, Communication with extended European search report, in Application No. 06845031.1, dated Feb. 2, 2011.

(Continued)

*Primary Examiner* — Chirag Shah
*Assistant Examiner* — Suk Jin Kang
(74) *Attorney, Agent, or Firm* — Sterne, Kessler, Goldstein & Fox P.L.L.C.

(57) ABSTRACT

Transporting call data is disclosed. A first call data associated with a first communication session and a second call data associated with a second communication session are received. The first call data and the second call data are bundled into a single data packet for transport over a packet data network.

28 Claims, 7 Drawing Sheets

(56) References Cited

U.S. PATENT DOCUMENTS

| | | | |
|---|---|---|---|
| 2006/0062225 A1* | 3/2006 | Li | 370/396 |
| 2006/0073811 A1* | 4/2006 | Ekberg | 455/411 |
| 2006/0154660 A1* | 7/2006 | Waugh et al. | 455/428 |
| 2006/0215635 A1* | 9/2006 | Bales et al. | 370/352 |
| 2006/0268761 A1* | 11/2006 | Bales et al. | 370/328 |
| 2006/0281441 A1* | 12/2006 | Okochi | 455/411 |
| 2007/0002788 A1* | 1/2007 | Schmidt et al. | 370/328 |
| 2007/0014410 A1* | 1/2007 | Panjwani et al. | 380/270 |
| 2007/0042776 A1* | 2/2007 | Bakshi et al. | 455/435.1 |
| 2007/0105554 A1* | 5/2007 | Clark et al. | 455/435.1 |
| 2007/0109959 A1* | 5/2007 | Koren et al. | 370/218 |
| 2007/0121594 A1* | 5/2007 | Lee et al. | 370/356 |
| 2007/0159967 A1* | 7/2007 | Bordonaro et al. | 370/229 |
| 2007/0201444 A1* | 8/2007 | Cannata et al. | 370/356 |
| 2008/0137648 A1* | 6/2008 | Lowmaster | 370/352 |
| 2008/0152059 A1* | 6/2008 | Suemitsu et al. | 375/356 |
| 2010/0069068 A1* | 3/2010 | Clark et al. | 455/435.1 |
| 2011/0289314 A1* | 11/2011 | Whitcomb | 713/155 |

OTHER PUBLICATIONS

Subbiah, B. et al., "User Multiplexing in RTP payload between IP Telephony Gateways; draft-ietf-avt-mux-rtp-00. txt", IETF Standard-Working-Draft, Internet Engineering Task Force, IETF, CH, vol. avt., Aug. 21, 1998, XP015015632, ISSN: 0000-0004.

Sze, H.P. et al., "A Multiplexing Scheme for H.323 Voice-Over-IP Applications", IEEE Journal on Selected Areas in Communications, IEEE Service Center, Piscataway, US, vol. 20, No. 7, Sep. 1, 2002, XP011065534, ISSN: 0733-8716.

Yin, N., et al., "Congestion Control for Packet Voice by Selective Packet Discarding," IEEE Transactions on Communications 38(5):674-683, IEEE, United States (1990) XP000136886, ISSN: 0090-6778.

European Search Report for European Patent Application No. EP 06 845 031, Munich, Germany, date Jan. 15, 2013.

* cited by examiner

TRANSPORTING CALL DATA VIA A PACKET DATA NETWORK

CROSS REFERENCE TO OTHER APPLICATIONS

This application claims priority to U.S. Provisional Patent Application No. 60/765,258 entitled TRANSPORTING CALL DATA VIA A PACKET DATA NETWORK filed Feb. 3, 2006, which is incorporated herein by reference for all purposes.

BACKGROUND OF THE INVENTION

Traditionally mobile network base transceiver stations (BTS) have exchanged data with the core mobile network via a dedicated, high capacity connection to an associated base station controller (BSC), e.g., a dedicated T-1/E-1 line. In some cases, it may be desirable to use an IP or other packet data network to enable a BTS to exchange data with a BSC. However, to meet quality of service obligations to carriers and/or provide a satisfactory call experience to users, care must be taken to ensure call data is communicated in an efficient manner that ensures safe and timely receipt at the destination.

Protocols such as the real-time transport protocol (RTP) have been provided to enable voice and similar data to be communicated reliably over an IP or other packet data network, however such protocols have associated with them certain overhead that consumes time and computing resources, e.g., to form headers, assign and track sequence numbers, etc. In certain mobile telecommunication networks, the size of each packet (or frame) of voice data is relatively small, and packets are required to be sent relatively frequently (e.g., every 20 msec), making the overhead associated with protocols such as RTP more burdensome in relation to the amount of data being transmitted. In addition, RTP or other protocol header information must be communicated over the network, consuming network bandwidth and potentially introducing greater latency in network communications. Therefore, there is a need for a way to maximize the voice or other call data transferred in relation to the overhead, network bandwidth use, and other resource consumption associated with the transport protocol used to transmit it.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Transporting call data efficiently via a packet data network is disclosed. In some embodiments, voice data for multiple calls (e.g., multiple TDM slots in the case of a GSM or other TDMA network) is bundled into a single RTP (or similar) packet, under a single RTP (or other protocol) header. On the receiving end, the RTP (or other) packet payload is parsed to identify and extract the call data for each call. In some embodiments, information included in the RTP (or other) header is used to parse the payload. In some embodiments, each portion of the payload includes a header containing data identifying the call/slot with which it is associated, a sequence number or data indicating how the data is to be used, and/or other information.

Figure 1:
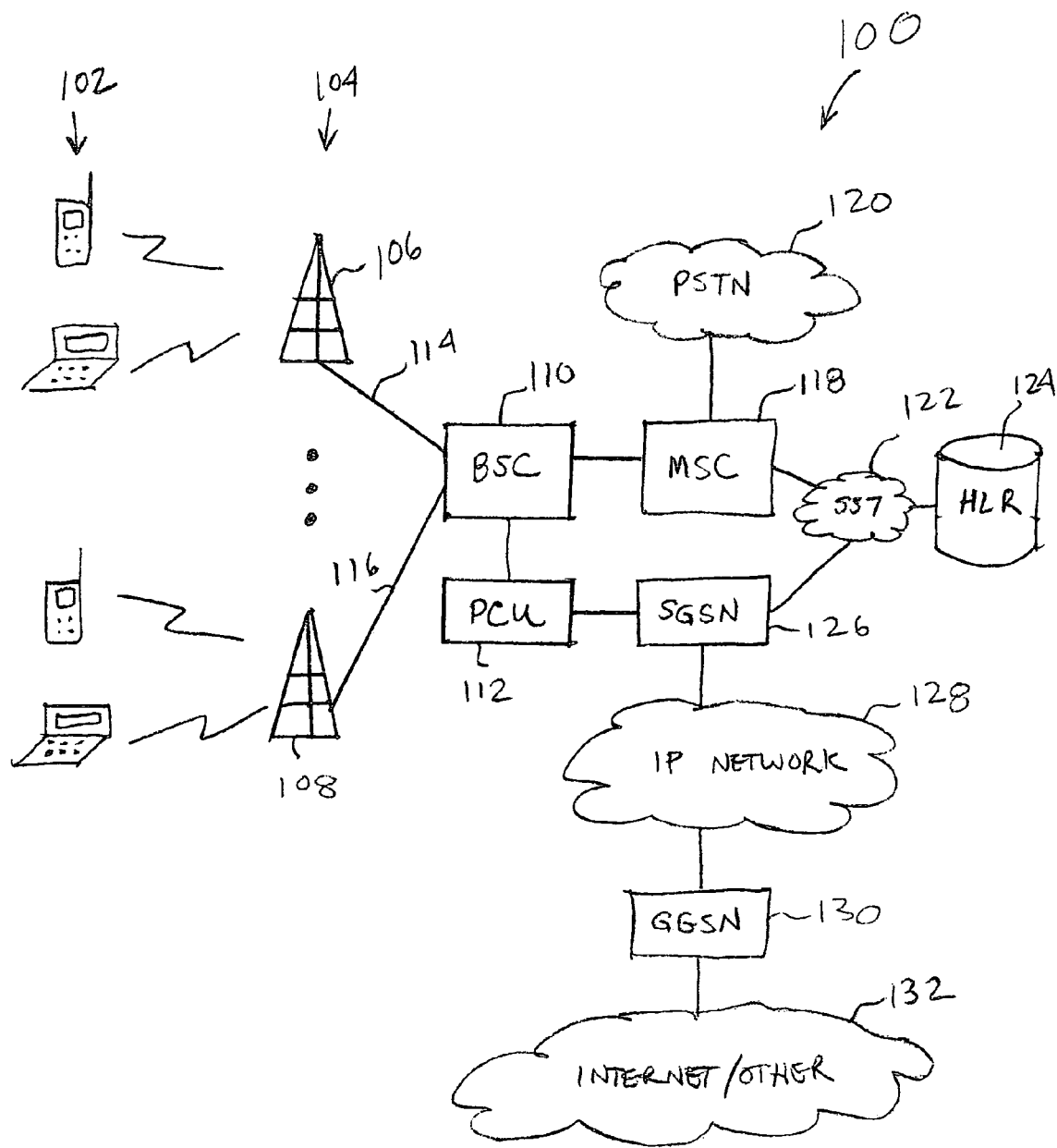
FIG. 1 is a block diagram illustrating elements of a typical GSM network.

FIG. 1 is a block diagram illustrating elements of a typical GSM network. In the example shown, GSM network 100 includes a plurality of mobile devices 102 connected via base transceiver stations 104, represented in FIG. 1 by BTS 106 and BTS 108, to a base station controller (BSC) 110. The BSC 110 has a packet control unit 112 associated with it, for handling non-voice network data communication (e.g., GPRS) packets. The BTS's are connected to the BSC via Abis links 114 and 116, respectively. The Abis interface is a standards-based interface that typically includes one or more elements and/or requirements that are specific and typically proprietary to an original equipment manufacturer (OEM) and/or other vendor of the BSC. Typically, the Abis interface/link is carried over a dedicated and private T-1/E-1 line. In the example shown, the BSC 110 is connected to a mobile switching center 118, to which the BSC 1110 is configured to route inbound voice data received from mobile equipment via a BTS and from which the BSC 110 is configured to receive outbound voice data. The MSC 118 connects to traditional telephone equipment and other networks via the public switched telephone network (PSTN) 120. The MSC 118 is connected via an SS7 (or other) network 122 to a home location register (HLR) 124 used to store subscriber data. To handle non-voice packet (e.g., GPRS) data, the PCU 112 is connected to an SGSN 126. In the example shown SGSN 126 is connected via SS7 network 122 to HLR 124. SGSN 126 is also connected via an IP network 128 and a GGSN 130 to the Internet (or other external packet data network) 132.

Figure 2:
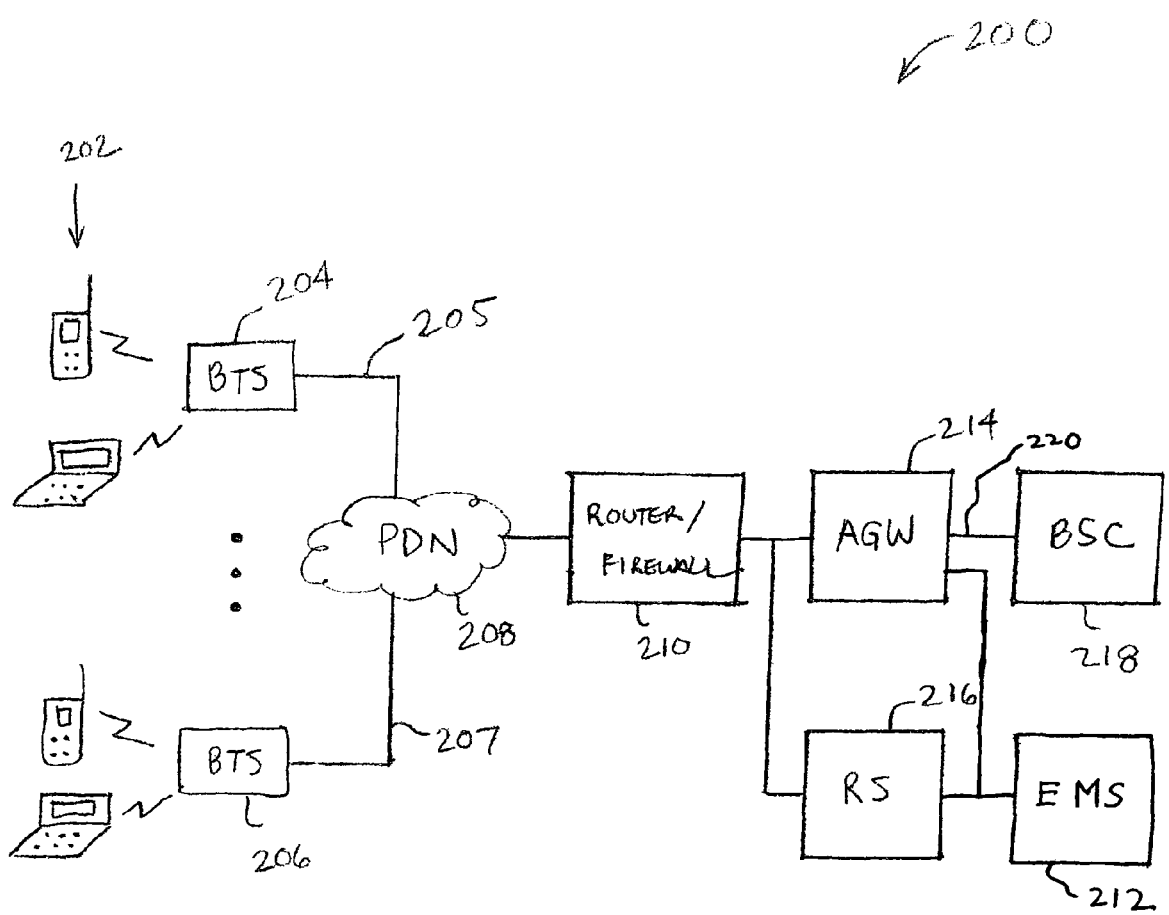
FIG. 2 is a block diagram illustrating an embodiment of a mobile network with packet data network backhaul.

FIG. 2 is a block diagram illustrating an embodiment of a mobile network with packet data network backhaul. In the example shown, the mobile network 200 includes mobile equipment 202 connected to a plurality of base transceiver stations represented in FIG. 2 by BTS 204 and BTS 206. BTS 204 and BTS 206 are connected via a local Internet access connection 205 and 207, respectively, to a packet data network (PDN) 208, such as the Internet. In some embodiments, mobile network data is sent, via PDN 208, between the base transceiver stations represented by BTS 204 and BTS 206, on the one hand, and AGW 214, on the other, using the Internet (IP) protocol. In various embodiments, Internet access connections 205 and 207 comprise a cable, DSL, or other modem collocated with the BTS and/or a local exchange carrier central office (LEC-CO) with DSLAM or cable head-end. Also connected to PDN 208 in the example shown in FIG. 2 is a router/firewall 210 connected to and configured to provide connectivity to and security with respect to an aggregation gateway 214, and a registration server 216. In some embodiments, element management server EMS 212 is connected to router/firewall 210. In some embodiments, router/firewall 210 is omitted and/or does not include a firewall. In various embodiments, element management server 212, an aggregation gateway 214, and a registration server 216 are included in one or more physical computing systems. Element management server 212 enables an administrator to perform operational, administrative, and/or management (OAM) operations with respect to one or more mobile network elements, e.g., BTS 204 or BTS 206. Aggregation gateway (AGW) 214 receives inbound mobile network data (voice, signaling, data, control/management) from one or more base transceiver stations (BTS), via PDN 208, aggregates data from two or more base transceiver stations (if/as applicable), and provides the inbound data to BSC 218 via one or more physical ports, using time division multiplex (TDM) as prescribed by the GSM standard and the BSC OEM's proprietary implementation of the Abis interface 220. In some embodiments, the AGW 214 is capable of interfacing with more than one type of BSC, e.g., with BSC's from two or more vendors. In some such embodiments, the AGW 214 is configured and/or provisioned, e.g., at deployment time, to use the Abis interface API of the particular type of BSC with which it is required to communicate in a particular installation. In some embodiments, an API or other interface specification or definition of the Abis interface as implemented by each BSC vendor/OEM the AGW is desired to be able to support is obtained and used as applicable to configure/provision the AGW to communicate with a particular BSC with which it is required to communicate. In some embodiments, BSC 218 is connected to a PCU, such as PCU 112 of FIG. 1. In some embodiments, AGW 214 is connected to a PCU. For example, BSC 218 is optional, and AGW 214 directly connected to a PCU.

In some embodiments, AGW 214 is configured to present two or more physical base transceiver stations to the BSC as a single logical BTS, to more efficiently use BSC resources in situations in which each BTS serves a relatively small service area and/or number of users. In some embodiments, AGW 214 is configured to map communications received from the BSC to the correct physical BTS and conversely to map communications received from two or more physical base transceiver stations to a single logical BTS prior to forwarding such inbound communications to the BSC.

Registration server 216 is configured to be used to register a BTS and/or other provider equipment with the network, e.g., to authenticate the equipment prior to providing to the equipment session keys to be used in secure communication protocols, identifying (e.g., address) information for other network elements, such as AGW 214, etc.

Each BTS in the mobile network 200 shown in FIG. 2 in some embodiments handles only a small fraction of the call volume/load of a conventional BTS, and in such embodiments AGW 214 promotes more efficient use of limited BSC resources. For example, in some embodiments AGW 214 aggregates data associated with multiple base transceiver stations and provides communication to/from the BSC via a fewer number of physical BSC ports (e.g., a single port). In various embodiments, use of PDN 208 and AGW 214 to transport data between base transceiver stations such as BTS 204 and BTS 206, on the one hand, and BSC 218, on the other, makes it commercially feasible to provide a small from factor and/or relatively low capacity BTS for use in remote (e.g., rural) service areas and/or to provide dedicated service to individuals and/or relatively small groups of users, such as a household or small business, since in addition to not requiring a BSC port for each BTS a dedicated T-1/E-1 line is not required.

While the example shown in FIG. 2 and in other embodiments described herein involves a GSM network and/or uses GSM nomenclature to refer to network elements, the techniques described herein are applied in other embodiments to other types of mobile telecommunications networks, and in particular may be applied wherever a plurality of relatively low capacity base transceiver stations need to exchange mobile communication data with a base station controller or other node having a limited number of relatively very high capacity ports or other resources.

Figure 3:
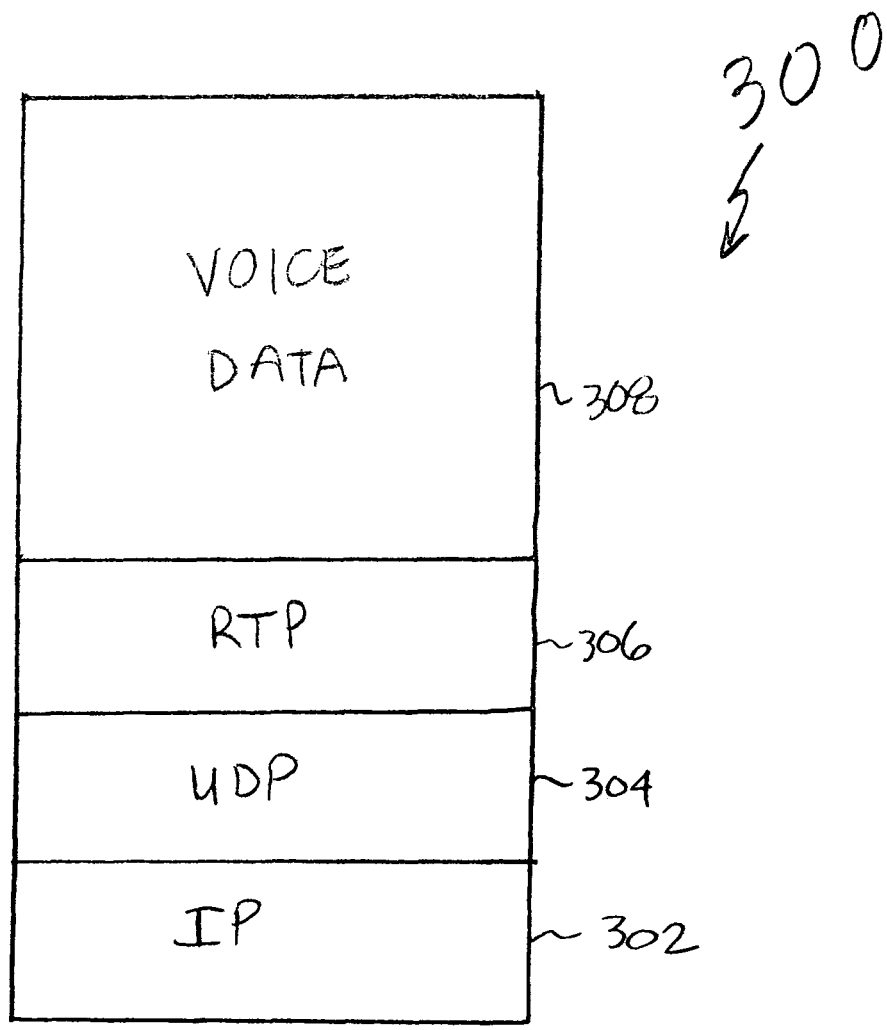
FIG. 3 is a block diagram illustrating an example of a Real-time Transport Protocol (RTP) packet.

FIG. 3 is a block diagram illustrating an example of a Real-time Transport Protocol (RTP) packet. The Real-time Transport Protocol (RTP) is used in some embodiments to transport voice call data from a BTS to an aggregation gateway, such as AGW 214 of FIG. 2, via an IP and/or other packet data network. In the example shown, RTP packet 300 is configured to be sent over an IP network using the UDP transport protocol and therefore includes an IP header 302 and a UDP header 304. RTP packet 300 also includes RTP header 306 which includes information such as an RTP sequence number indicating the place of a particular packet in a sequence of packets associated with a call. Finally, RTP packet 300 includes a voice data payload 308, which in a typical prior art RTP implementation includes up to 40 bytes of call data associated with a single call.

Figure 4:
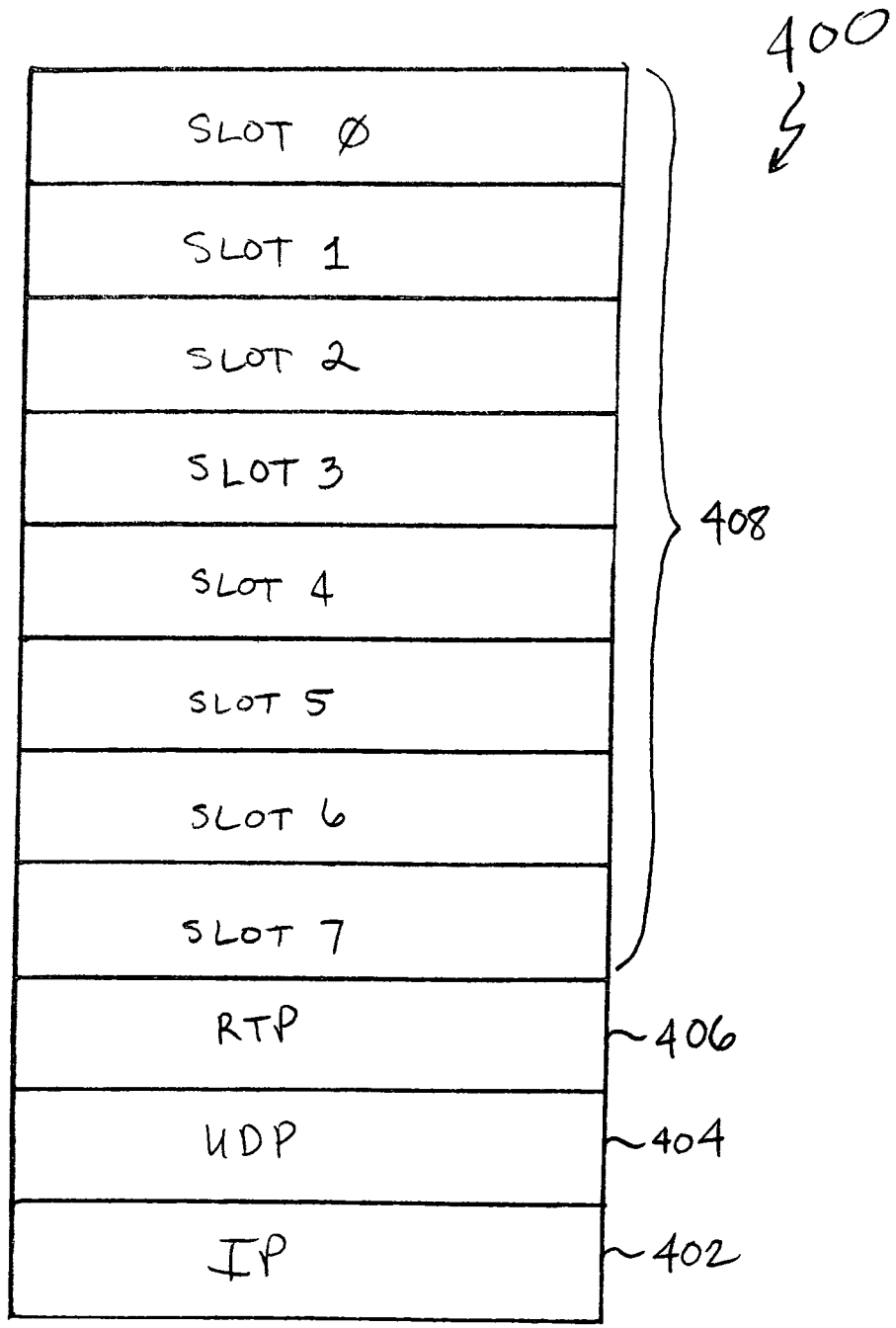
FIG. 4 is a block diagram illustrating an embodiment of a Real-time Transport Protocol (RTP) packet used to bundle call data.

FIG. 4 is a block diagram illustrating an embodiment of a Real-time Transport Protocol (RTP) packet used to bundle call data. In some embodiments, an RTP packet with call data bundling, such as the RTP packet 400 of FIG. 4, is used to transport call data for multiples calls/channels, e.g., multiple TDMA slots, in a single RTP packet. In some embodiments, such bundling minimizes the overhead associated with forming RTP packets and makes efficient use of available bandwidth on an IP and/or other data network used to transport call data, e.g., between a BSC/AGW and a BTS as described above. The packet 400 includes an IP header 402, a UDP header 404, and an RTP header 406. The packet 400 also includes up to 40 bytes of payload 408, divided among in this example eight TDM slots 0-7. In some embodiments, upon receipt at a destination (e.g., BTS or AGW) the headers 402-406 are removed and processed, and payload 408 is parsed to extract the enclosed data for up to eight slots. In some embodiments, a particular RTP packet may include data for one up to a maximum number of slots (eight in this example), depending on the number of slots for which data was received and/or otherwise available on the sending end when the time to send the RTP packet arrived, which may depend in various embodiments on such factors as whether there is an active call associated with each slot and/or whether data associated with a call was lost or delayed or otherwise did not arrive in time to be included in the packet. In some embodiments a proprietary header included in the payload indicates how many slots worth of data are included. In some embodiments, the header specifies the slots for which data is included. In some embodiments, the payload is parsed to determine for how many and/or for which slots data is included in the payload 408. In some embodiments, for each slot the associated data includes a slot header with data associated with the slot data for that slot, such as an RTP or similar sequence number for the data associated with that slot. While in the example shown in FIG. 4 up to eight slots worth of data may be included in payload 408, in other embodiments the maximum number of slots worth of data may be more or less, depending on such factors as the capacity, maximum packet size, and/or other characteristics. In some embodiments, the maximum number of slots for which call data is bundled into a single RTP packet is fourteen, representing a maximum of seven voice data slots for each of two transceivers at a BTS.

Figure 5:
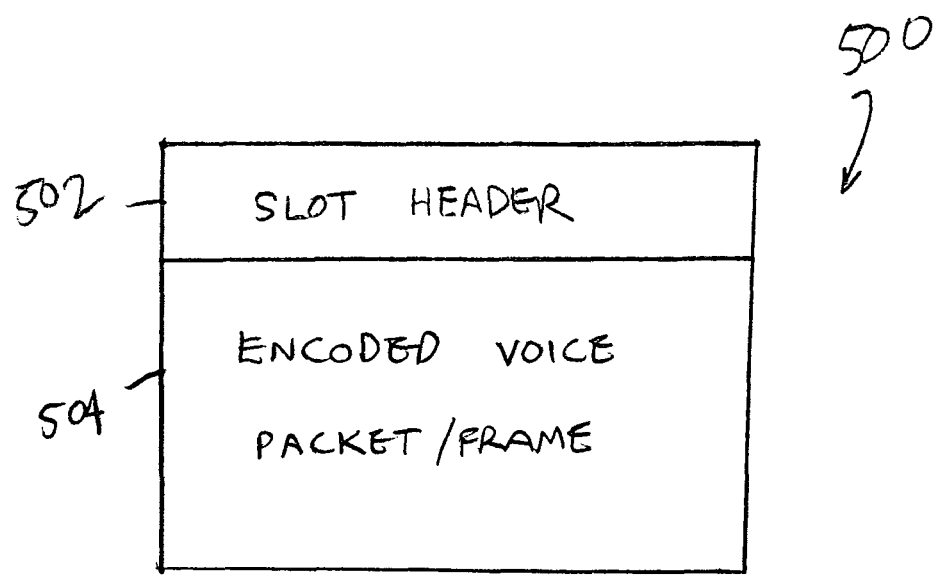
FIG. 5 is a block diagram illustrating an embodiment of a slot data portion of the payload of a Real-time Transport Protocol (RTP) packet used to bundle call data.

FIG. 5 is a block diagram illustrating an embodiment of a slot data portion of the payload of a Real-time Transport Protocol (RTP) packet used to bundle call data. In some embodiments, the slot data portion 500 of FIG. 5 is included for each slot for which data is included in a payload portion of an RTP packet used to bundle call data, such as payload 408 of FIG. 4. The slot data portion 500 includes a slot header 502 containing data associated with the slot data, e.g., identifying the slot and/or other call information with which encoded voice packet and/or frame data included in the payload portion 504 of the slot data portion 500 is associated.

Figure 6:
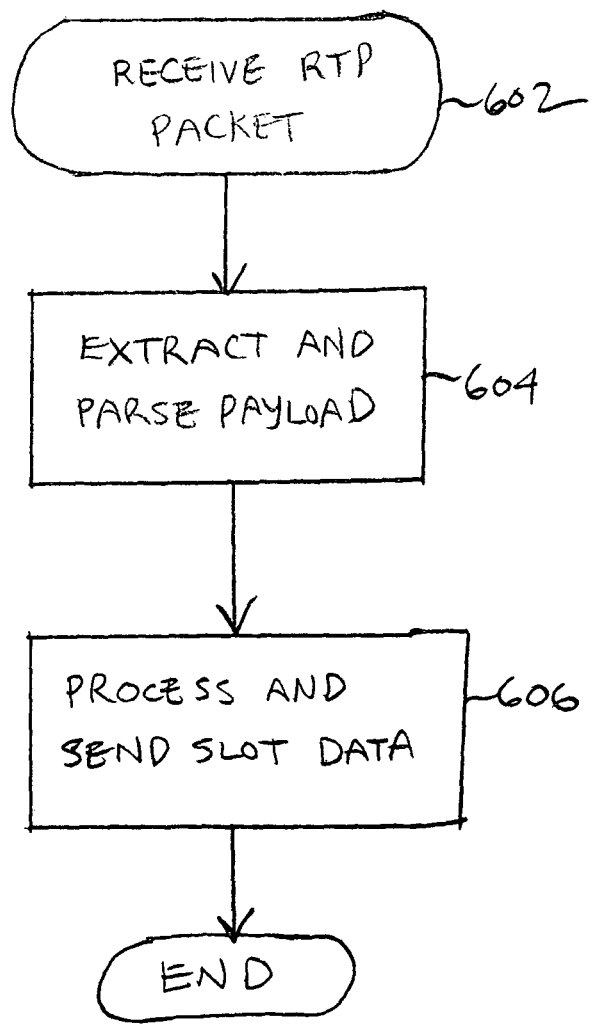
FIG. 6 is a flow chart illustrating an embodiment of a process for receiving and processing a Real-time Transport Protocol (RTP) packet used to bundle call data.

FIG. 6 is a flow chart illustrating an embodiment of a process for receiving and processing a Real-time Transport Protocol (RTP) packet used to bundle call data. In some embodiments, the process of FIG. 6 is implemented at an aggregation gateway and/or BSC for inbound call data received from a BTS via an IP network and/or at a BTS for outbound call data received from an aggregation gateway and/or BSC via an IP network. In the example shown, when an RTP packet is received (602) the payload portion is extracted and parsed (604) to obtain the enclosed data for at least one or up to a maximum number of slots. The slot data is then processed and for each slot the associated encoded voice data (packet and/or frame) is sent to its destination, e.g., sent via an Abis link to a BSC in the case of inbound data received at an AGW or transmitted via an air link to a mobile equipment in the case of outbound data received at a BTS.

Figure 7:
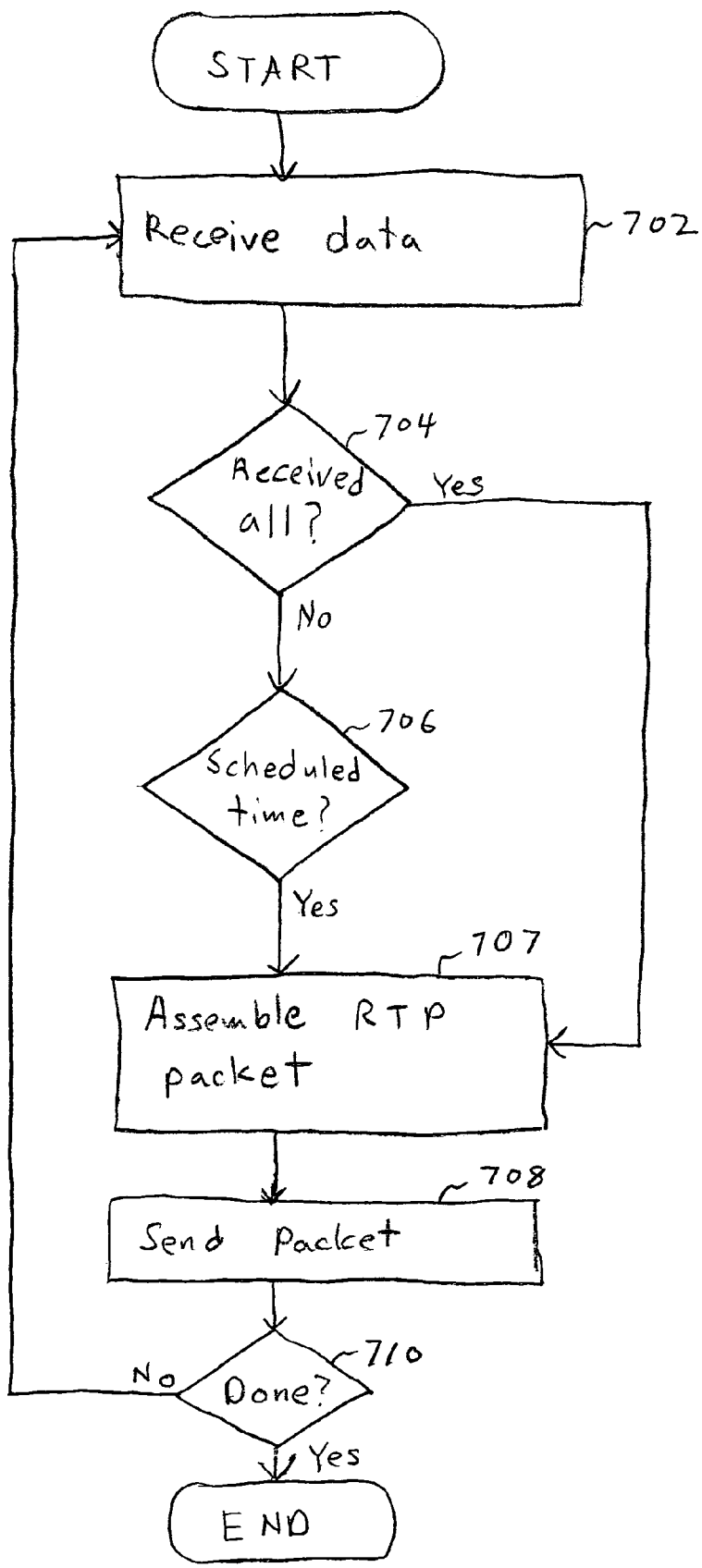
FIG. 7 is a flow chart illustrating an embodiment of a process for bundling call data for multiple slots into a Real-time Transport Protocol (RTP) packet.

FIG. 7 is a flow chart illustrating an embodiment of a process for bundling call data for multiple slots into a Real-time Transport Protocol (RTP) packet. In some embodiments, the process of FIG. 7 is implemented at an aggregation gateway and/or BSC for outbound call data being sent to a BTS via an IP network and/or at a BTS for inbound call data being sent to an aggregation gateway and/or BSC via an IP network. As packet data is received, an RTP packet including slot data for at least one and up to a maximum number of slots is formed. In the example shown, the RTP packet is assembled (707) and sent (708) either as soon as call data for all (active) slots has been received (704) or a scheduled transmission time arrives (706). In some embodiments, e.g., a GSM environment, an RTP packet is transmitted every 20 msec even if call data for one or more active slots has not yet been received and cannot be included in the packet. In some embodiments, late arriving packets are dropped and not sent in a subsequent RTP packet. In other embodiments, late-arriving packets are sent in a subsequent RTP packet so long as they are not late by a period that exceeds a prescribed threshold. In the example shown, 702-708 are repeated for successive RPT packets until no further call data remains to be processed (710), after which the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of transporting call data, comprising:
receiving, at a first base transceiver station of a plurality of base transceiver stations, a first call data associated with a first communication session and a second call data associated with a second communication session; and
bundling, at the first base transceiver station, the first call data and the second call data into a single real-time transport protocol (RTP) data packet for transport over a packet data network to an aggregation gateway (AGW), wherein the first call data is a late arriving call data that should have been included in a previously bundled data packet, and the first call data is bundled in the single RTP data packet after it is determined that the first call data is not late by a period that exceeds a prescribed threshold, wherein the first base transceiver station registers over the packet data network with a registration server before communicating with the AGW, wherein the registration server provides the first base transceiver station with keys for use in secure communications and an address of the AGW, wherein the AGW is connected, to a base station controller (BSC) in a mobile cellular network, wherein the AGW aggregates communications from the plurality of base transceiver stations and sends the aggregated communications to the BSC, and wherein the AGW presents the plurality of base transceiver stations as a single logical base transceiver station to the BSC.

2. The method according to claim 1, wherein the first call data and the second call data are included in a plurality of received call data associated with a plurality of communication sessions, and the plurality of received call data is bundled in the single data packet.

3. The method according to claim 1, wherein the first call data and the second call data are associated with time slots in time division multiplexing.

4. The method according to claim 1, further comprising sending the single data packet via the packet data network.

5. The method according to claim 4, wherein the single data packet is sent to an entity configured to process the single data packet and forward at least a portion of the processed data to a base station controller via an interface defined by a third party base station controller vendor.

6. The method according to claim 4, wherein the single data packet is sent to a base transceiver station.

7. The method according to claim 4, wherein the single data packet is sent to a base station controller.

8. The method according to claim 1, further comprising associating with the single data packet, a single call data transport protocol header.

9. The method according to claim 8, wherein the single call data transport protocol header includes information identifying data contained in the single data packet.

10. The method according to claim 8, wherein the single call data transport protocol header specifies a number of segments included in the single data packet.

11. The method according to claim 10, wherein each of the segments that contain data includes an individual header specifying a sequence number associated with the corresponding data.

12. The method according to claim 1, wherein at least a portion of the first call data includes control data.

13. The method according to claim 1, wherein the single data packet includes an IP header, a UDP header, and an RTP header, and the RTP header includes an RTP sequence number indicating the place of the single data packet in a sequence of packets.

14. The method according to claim 1, wherein the single data packet includes a plurality of segments that can contain call data, and bundling the first call data and the second call data into the single data packet includes placing at least a portion of the first call data into one of the segments and placing at least a portion of the second call data into another one of the segments.

15. The method according to claim 14, wherein bundling the first call data and the second call data into the single data packet includes associating individual headers to each of the segments that contains call data.

16. The method according to claim 15, wherein each of the individual headers includes a sequence number associated with call data contained in the corresponding segment.

17. The method according to claim 14, wherein call data contained in different segments of the single data packet are associated with different communication sessions.

18. The method according to claim 14, wherein call data contained in the segments are associated with a time slot in time division multiplexing.

19. The method according to claim 14, wherein the number of segments that can be contained in the single data packet is bounded by a specified maximum.

20. The method according to claim 1, wherein the single data packet is sent via the packet data network at the earlier of when all of the segments contain call data or when a scheduled time is reached.

21. The method according to claim 1, wherein the first call data is associated with data received at a base transceiver station via a radio frequency transmission.

22. The method according to claim 1, wherein the packet data network is used as a backhaul of a mobile communication provider network.

23. A system for transporting call data, comprising:
a communication interface in a first base transceiver station of a plurality of base transceiver stations, the communication interface being configured to receive a first call data associated with a first communication session and a second call data associated with a second communication session; and
a processor configured to bundle, at the first base transceiver station, the first call data and the second call data into a single real-time transport protocol (RTP) data packet for transport over a packet data network to an aggregation gateway (AGW),
wherein the first call data is a late arriving call data that should have been included in a previously bundled data packet, and the first call data is bundled in the single RTP data packet after it is determined that the first call data is not late by a period that exceeds a prescribed threshold,
wherein the first base transceiver station registers with a registration server before communicating with the AGW, wherein the registration server provides the first base transceiver station with keys for use in secure communications and an address of the AGW, wherein the AGW is connected to a base station controller (BSC) in a mobile cellular network, wherein the AGW aggregates communications from the plurality of base transceiver stations and sends the aggregated communications to the BSC, and wherein the AGW presents the plurality of base transceiver stations as a single logical base transceiver station to the BSC.

24. The system according to claim 23, wherein the first call data and the second call data are associated with time slots in time division multiplexing.

25. The system according to claim 23, wherein each call data segment of the single data packet includes an individual header specifying a sequence number associated with the corresponding call data.

26. A computer program product for transporting call data, the computer program product being embodied in a non-transitory computer readable storage medium and comprising computer instructions for:
receiving, at a first base transceiver station of a plurality of base transceiver stations, a first call data associated with a first communication session between a first wireless device and a second wireless device and a second call data associated with a second communication session between a third wireless device and a fourth wireless device; and
bundling, at the first base transceiver station, the first call data and the second call data into a single real-time transport protocol (RTP) data packet for transport over a packet data network to an aggregation gateway (AGW),
wherein the first call data is a late arriving call data that should have been included in a previously bundled data packet, and the first call data is bundled in the single RTP data packet after it is determined that the first call data is not late by a period that exceeds a prescribed threshold,
wherein the first base transceiver station registers with a registration server before communicating with the AGW, wherein the registration server provides the first base transceiver station with keys for use in secure communications and an address of the AGW, wherein the AGW is connected, to a base station controller (BSC) in a mobile cellular network, wherein the AGW aggregates communications from the plurality of base transceiver stations and sends the aggregated communications over a single dedicated line to the BSC, and wherein the AGW presents the plurality of base transceiver stations as a single logical base transceiver station to the BSC.

27. The computer program product according to claim 26, wherein the first call data and the second call data are associated with time slots in time division multiplexing.

28. The computer program product according to claim 26, wherein each call data segment of the single data packet includes an individual header specifying a sequence number associated with the corresponding call data.

* * * * *